(12) United States Patent
Veedu et al.

(10) Patent No.: US 8,173,734 B1
(45) Date of Patent: May 8, 2012

(54) HYBRID NANOCOMPOSITE FOR FIRE RETARDING APPLICATIONS

(75) Inventors: Vinod P Veedu, Honolulu, HI (US); Venkat Kamavaram, Honolulu, HI (US)

(73) Assignee: Oceanit Laboratories, Inc., Honolulu, HI (US)

( * ) Notice: Subject to any disclaimer, the term of this patent is extended or adjusted under 35 U.S.C. 154(b) by 63 days.

(21) Appl. No.: 12/798,614

(22) Filed: Apr. 8, 2010

Related U.S. Application Data

(60) Provisional application No. 61/212,218, filed on Apr. 8, 2009.

(51) Int. Cl.
*C08K 3/34* (2006.01)
*C08K 3/04* (2006.01)

(52) U.S. Cl. .......... 524/445; 524/495; 524/496
(58) Field of Classification Search .......... 524/445, 524/495, 496
See application file for complete search history.

(56) References Cited

FOREIGN PATENT DOCUMENTS
WO   WO 2007/127906   * 11/2007
* cited by examiner

*Primary Examiner* — Peter Szekely
(74) *Attorney, Agent, or Firm* — James Creighton Wray

(57) ABSTRACT

Clay platelets are separated from an agglomeration of clay platelets by treating with cobalt acetate and leaving cobalt particles on the platelets. Carbon nanotubes are grown on the platelets at the cobalt sites, and the nanotubes separate platelets from the agglomeration. The separated platelets and nanotubes are acid cleaned. Intumescent fire retardant materials are chemisorbed on the clay platelets and nanotubes.

23 Claims, 2 Drawing Sheets

HYBRID NANOCOMPOSITE FOR FIRE RETARDING APPLICATIONS

This application claims the benefit of U.S. Provisional Application No. 61/212,218, filed Apr. 8, 2009, which is hereby incorporated in its entirety.

SUMMARY OF THE INVENTION

The invention applies to and is related to materials science, flame retarding material and fire resistant protective coatings.

This invention provides CNTs, hybrid nanocomposite materials using CNTs grown on nanoclay platelets for efficient dispersion of clay platelets, and intumescent compound functionalized CNTs and clay-CNTs, which act as fire resistant barriers preventing heat propagation through the composite structure or coatings.

The invention provides fire resistant coatings and structural materials. The coatings comprise of and not limited to polymers such as epoxies, vinyl esters and polyurethanes and similar polymers.

Nanomaterials are new and not applied extensively and hence need several years for wide-scale application and market adoption.

The invention provides efficient dispersion (exfoliation) of nanomaterials and improved fire resistance performance. The developed nanocomposite material performs superior in the above areas.

Current technologies use nanomaterials or hybrid materials formed by shear mixing of two or more nanomaterials. The invention is based on CNTs, hybrid material prepared by growing CNTs on nanoclay platelets, and intumescent compound functionalized CNTs and clay-CNTs, which is unique and advantageous. The hybrid material produced by the new method can efficiently separate individual clay platelets from the agglomerates. Efficient dispersion of clay platelets is the key for developing fire resistant composite materials. Until now there has been no method of separating individual clay platelets for dispersion in a polymer matrix. Intumescent compound functionalization of CNTs and clay-CNTs hybrid is a unique method of dispersing and enhancing the fire resistance performance.

The state of the art fire resistant composites invariably use intumescent fire retardants such as halogen, phosphorous, aluminum tri-hydroxide (ATH), magnesium hydroxide (MDH), antimony ($Sb_2O_3$, $Sb_2O_5$), iron (eg. ferrocene, FeOOH, FeOCl), molybdenum ($MoO_3$), zinc oxide (ZnO) and tin oxide ($SnO_2$) based materials. These traditional fire retardant materials have several shortcomings. High loadings affect the physical properties of base composite and produce toxic and corrosive combustion products along with enormous amounts of carbon dioxide and smoke, which essentially defeat their main purpose.

Nanomaterials were investigated for modifying the flammability properties of polymers. Prior studies have suggested that the combustion mechanism of nanocomposites depends on both a physical action (surface ceramisation) and a chemical action (e.g. catalyzed polymer charring). As a result, nanocomposites burn at a much lower rate than the pure matrix material. Hence, nanomaterials based composites provide a unique solution to the most prevalent problem.

There have been several reports that propose using nanomaterials such as carbon nanotubes and nanoclay for developing flame retarding nanocomposite polymers. Although improved performance by using nanomaterials was clearly evident, severe difficulties in dispersing nanomaterials in polymers have prevented full utilization of unique properties of nanomaterials.

Numerous studies to achieve complete dispersion (exfoliation) of clay, carbon nanotubes (CNTs) via mechanical and chemical approaches have not been successful. Even mixing different nanomaterials together in polymer matrix to harness the beneficial properties of each was reported to show improved fire resistance performance of composite materials. The current technology uses nanomaterials or hybrid materials formed by shear mixing of two or more nanomaterials.

The present invention is both simple and unique. It is entirely different from previous methods.

A hybrid nanostructure based on clay-CNTs is produced by controlled vapor deposition (CVD) growth of CNTs on clay platelets and later the intumescent materials are chemisorbed onto CNTs deposited on clay platelets. The new hybrid nanostructure is provided to exhibit enhanced fire resistant performance.

In the invention nanoclay is initially modified by treating it with cobalt acetate to incorporate cobalt catalyst particles onto clay platelets via a chemical process. Later, the modified clay is used as substrate to grow carbon nanotubes (CNTs) via a chemical vapor deposition (CVD) process at about 800° C. using hydrocarbon gas as carbon source. It is observed that CNTs grow on the surface of clay where the cobalt catalyst particles were previously incorporated.

A major advantage of the current invention is that the CNTs during growth separate the clay platelets from the agglomerates, which heretofore has been essentially difficult to achieve due to strong intermolecular attraction between the clay platelets.

Moreover, during combustion, due to viscosity changes at high temperature in the composites, the nanomaterials have segregated, thus reducing the barrier effect in preventing the propagation of heat through the composite.

However, in the invention both the clay platelets and the CNTs are effectively dispersed and held in position during combustion, which is mandatory to prevent further propagation of heat after initial combustion.

A hybrid intumescent functionalized nanostructure is produced by chemisorptions of intumescent fire retardant compounds (ATH, MDH, and $Sb_2O_3$ etc.) onto CNTs and hybrid clay-CNTs nanostructure.

In the invention, the nanomaterials are chemically treated with concentrated mineral acid to purify and improve wetting characteristics by incorporating surface groups (—OH, —COOH etc.). The acid treated nanomaterials and intumescent compound precursor are dissolved in a solution with the aid of surfactant to form a homogeneous mixture. The mixture is treated thermally or chemically to reduce the intumescent compound precursor into the intumescent fire retardant material. Since the reduction occurs in the solution with acid treated nanomaterials, the intumescent fire retardant material is functionalized onto the nanomaterials.

The hybrid intumescent functionalized nanostructures have a unique advantage of enhanced fire retarding performance afforded by the uniform dispersion of hybrid intumescent nanostructures. In addition, significantly reduced quantity of hybrid intumescent nanostructure material is sufficient to provide the necessary fire performance.

These and further and other objects and features of the invention are apparent in the disclosure, which include the above and ongoing written specification, with the claims and the drawings.

DETAILED DESCRIPTION OF THE DRAWINGS

Figure 1:
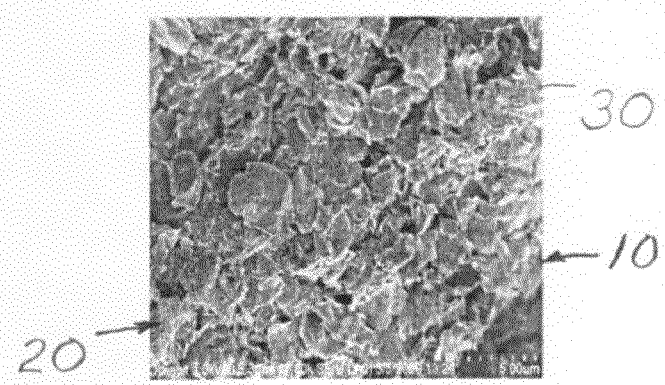
FIG. 1 is a scanning electron microscope (SEM) image of a pristine clay agglomerate.

FIG. 1 shows a scanning electron microscope (SEM) micrograph 10 of a pristine clay agglomerate 20 showing clay platelets 30. The clay agglomerate is treated with cobalt acetate, which leaves cobalt particles on the platelets.

Figure 2:
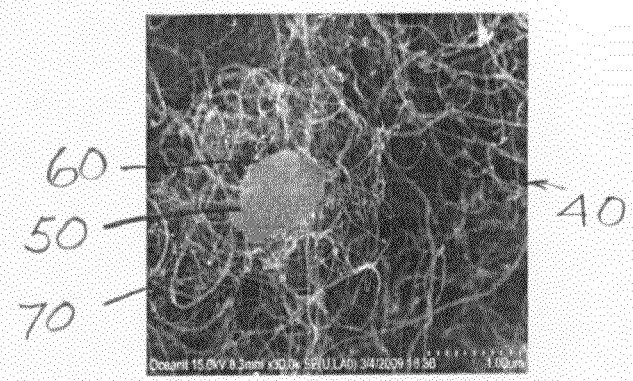
FIG. 2 is an SEM image of clay platelet with CNTs grown on the surface.

FIG. 2 shows a scanning electron microscope (SEM) micrograph 40 of a clay platelet 50 on which cobalt catalyst particles 60 have been deposited by treating platelets 30 with cobalt acetate. Carbon nanotubes 70 (CNTs) have been grown on the surface of the platelets 50 via chemical vapor deposition (CVD) at 800° C. using hydrocarbon gas as the carbon source for the CNTs. The CNTs 70 grow on the surface of the clay platelets 50 where the cobalt particles previously were attached.

The growth of the CNTs 70 separates the clay platelets 50 against a strong intermolecular attraction between the platelets 50.

Figure 3:
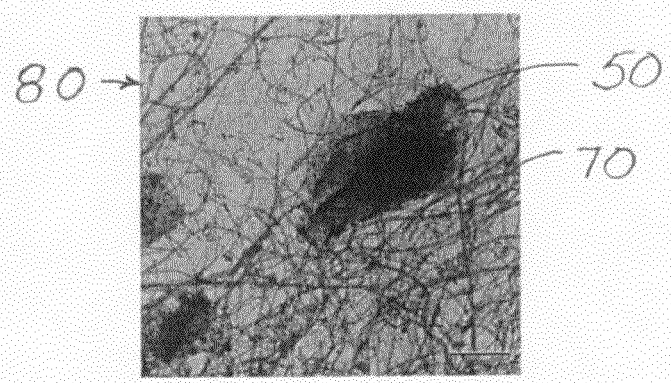
FIG. 3 is a TEM image of a clay platelet with CNTs.

FIG. 3 is a micrograph 80 formed by a transmission electron microscope (TEM), showing platelets 50 on which CNTs 70 have been grown. The result is that the clay platelets 50 and CNTs 70 are substantially uniformly dispersed as a substrate throughout a polymer and enhance fire resistance.

Figure 4:
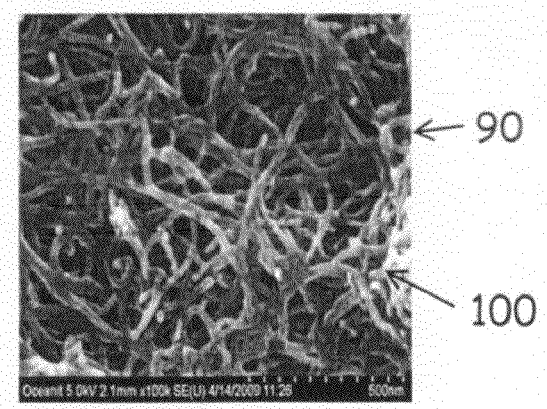
FIG. 4 is an SEM image of acid cleaned CNTs.

FIG. 4 shows a scanning electron micrograph 90 of acid cleaned CNTs 100 free of any impurities.

Figure 5:
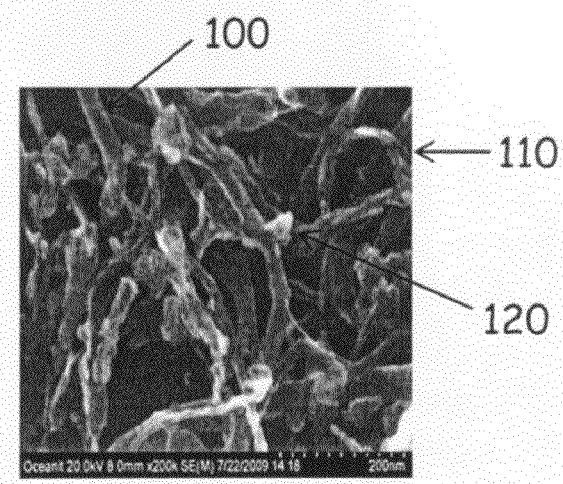
FIG. 5 is an SEM image of intumescent aluminum tri-hydroxide (ATH) chemisorbed acid treated CNTs.

FIG. 5 is a scanning electron micrograph 110 of acid cleaned CNTs 100 on which intumescent fire retardant material aluminum tri-hydroxide (ATH) 120 is chemisorbed by thermal or chemical reduction method.

While the invention has been described with reference to specific embodiments, modifications and variations of the invention may be constructed without departing from the scope of the invention, which is defined in the following claims.

We claim:

1. A method of producing hybrid nanocomposite fire retardant materials comprising:
   treating clay platelets in an agglomerate of clay platelets with cobalt acetate,
   leaving cobalt particles on the clay platelets,
   chemically vapor depositing carbon on the platelets,
   growing carbon nanotubes on the platelets from the vapor deposition,
   separating the platelets with the grown carbon nanotubes from the clay platelets agglomerate by the grown carbon nanotubes,
   dispersing the platelets with the grown carbon nanotubes throughout a polymer,
   acid cleaning grown carbon nanotubes on the clay platelets before dispersing the platelets with the grown carbon nanotubes throughout the polymer, and
   chemisorbing an intumescent fire retardant material on the acid cleaned walls of carbon nanotubes grown on the clay platelets before dispersing the platelets with the grown carbon nanotubes throughout the polymer.

2. The method of claim 1, wherein the chemisorbing is by thermal reduction or chemical reduction.

3. The method of claim 2, wherein the intumescent fire retardant material is aluminum tri-hydroxide.

4. The method of claim 2, wherein the intumescent fire retardant material is selected from the group consisting of halogen, phosphorous, aluminum tri-hydroxide (ATH), magnesium hydroxide (MDH), antimony ($Sb_2O_3$, $Sb_2O_5$), iron, ferrocene (FeOOH, FeOCl), molybdenum ($MoO_3$), zinc oxide (ZnO) and tin oxide ($SnO_2$) based materials, and combinations thereof.

5. The method of claim 1, wherein the polymer comprises epoxy, vinyl ester or polyurethane.

6. The method of claim 1, wherein the intumescent fire retardant material is aluminum tri-hydroxide.

7. The method of claim 1, wherein the intumescent fire retardant material is selected from the group consisting of halogen, phosphorous, aluminum tri-hydroxide (ATH), magnesium hydroxide (MDH), antimony ($Sb_2O_3$, $Sb_2O_5$), iron, ferrocene (FeOOH, FeOCl), molybdenum ($MoO_3$), zinc oxide (ZnO) and tin oxide ($SnO_2$) based materials, and combinations thereof.

8. A method of producing fire retardant materials comprising:
   treating clay platelets in an agglomerate with cobalt acetate,
   leaving cobalt particles on the clay platelets,
   chemically vapor depositing nanomaterials on the platelets,
   growing on the platelets nanomaterials from the vapor deposition,
   separating the platelets from the agglomerate with the grown nanomaterials, and
   acid cleaning the grown carbon nanomaterials on the clay platelets.

9. The method of claim 8, further comprising chemisorbing intumescent fire retardant material on the acid cleaned grown nanomaterials on the clay platelets, and dispersing the platelets with the grown nanomaterials and intumescent material throughout a polymer.

10. The method of claim 9, wherein the cleaned nanomaterials and the intumescent material precursors are dissolved in a solution with a surfactant.

11. The method of claim 9, wherein the intumescent fire retardant material is aluminum tri-hydroxide.

12. The method of claim 9, wherein the intumescent fire retardant material is selected from the group consisting of halogen, phosphorous, aluminum tri-hydroxide (ATH), magnesium hydroxide (MDH), antimony ($Sb_2O_3$, $Sb_2O_5$), iron, ferrocene (FeOOH, FeOCl), molybdenum ($MoO_3$), zinc oxide (ZnO) and tin oxide ($SnO_2$) based materials, and combinations thereof.

13. The method of claim 9, wherein the polymer comprises epoxy, vinyl ester or polyurethane.

14. A method comprising separating platelets of material from an agglomeration by growing nanomaterial on the platelets and separating the platelets from the agglomeration by the growing nanomaterial.

15. The method of claim 14, further comprising initially treating the platelets with a growth depositing material.

16. The method of claim 15, wherein the platelets are clay platelets, the agglomeration is an agglomeration of clay platelets, wherein the contacting comprises treating the agglomeration of clay platelets with cobalt acetate and leaving cobalt particles on the clay platelets.

17. The method of claim 16, further comprising cleaning the grown nanomaterial, attaching a intumescent material on the cleaned nanomaterial.

18. The method of claim 17, further comprising dispersing the intumescent material coated clay platelets and nanomaterial in a polymer.

19. The method of claim 18, wherein the nanomaterial is carbon nanotubes, wherein the cleaning is acid cleaning, wherein the attaching is chemisorbing and wherein the intumescent material is fire retardant material.

20. Apparatus comprising clay platelets having nanomaterials grown thereon and being separated from an agglomeration of clay platelets by the grown nanomaterial, wherein the grown nanomaterials are acid cleaned and intumescent materials are attached to the acid cleaned grown nanomaterials by thermal reduction or chemical reduction chemisorbing.

21. The apparatus of claim 20, wherein the grown nanomaterials are carbon nanotubes and the attached intumescent materials are attached fire retardant materials.

22. The apparatus of claim 21, wherein the attached fire retardant materials are selected from the group of fire retardant materials consisting of halogen, phosphorous, aluminum tri-hydroxide (ATH), magnesium hydroxide (MDH), antimony ($Sb_2O_3$, $Sb_2O_5$), iron, ferrocene (FeOOH, FeOCl), molybdenum ($MoO_3$), zinc oxide (ZnO) and tin oxide ($SnO_2$) based materials, and combinations thereof.

23. The apparatus of claim 21, wherein the clay platelets with the grown carbon nanotubes and attached intumescent fire retardant materials are dispersed throughout a polymer.

\* \* \* \* \*